US011257487B2

(12) United States Patent
Casado

(10) Patent No.: US 11,257,487 B2
(45) Date of Patent: Feb. 22, 2022

(54) DYNAMIC AND/OR CONTEXT-SPECIFIC HOT WORDS TO INVOKE AUTOMATED ASSISTANT

(71) Applicant: Google LLC, Mountain View, CA (US)

(72) Inventor: Diego Melendo Casado, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 80 days.

(21) Appl. No.: 16/618,681

(22) PCT Filed: Aug. 21, 2018

(86) PCT No.: PCT/US2018/047281
§ 371 (c)(1),
(2) Date: Dec. 2, 2019

(87) PCT Pub. No.: WO2020/040745
PCT Pub. Date: Feb. 27, 2020

(65) Prior Publication Data
US 2020/0342855 A1    Oct. 29, 2020

(51) Int. Cl.
*G10L 15/00*   (2013.01)
*G10L 15/183*  (2013.01)
*G10L 15/22*   (2006.01)

(52) U.S. Cl.
CPC ............ *G10L 15/183* (2013.01); *G10L 15/22* (2013.01); *G10L 2015/223* (2013.01)

(58) Field of Classification Search
CPC . G10L 15/183; G10L 2015/223; G10L 15/20; G10L 15/22; G10L 15/187;
(Continued)

(56) References Cited

U.S. PATENT DOCUMENTS 6,532,447 B1   3/2003  Christensson
6,665,639 B2  12/2003  Mozer et al.
(Continued)

FOREIGN PATENT DOCUMENTS

WO    2014059416    4/2014

OTHER PUBLICATIONS

European Patent Office; Communication Pursuant to Article 94(3) issue in Application No. 18773684.8; 7 pages; dated Apr. 23, 2020.
(Continued)

*Primary Examiner* — Huyen X Vo
*Assistant Examiner* — Darioush Agahi
(74) *Attorney, Agent, or Firm* — Middleton Reutlinger

(57) ABSTRACT

Techniques are described herein for enabling the use of "dynamic" or "context-specific" hot words to invoke an automated assistant. In various implementations, an automated assistant may be executed in a default listening state at least in part on a user's computing device(s). While in the default listening state, audio data captured by microphone(s) may be monitored for default hot words. Detection of the default hot word(s) transitions of the automated assistant into a speech recognition state. Sensor signal(s) generated by hardware sensor(s) integral with the computing device(s) may be detected and analyzed to determine an attribute of the user. Based on the analysis, the automated assistant may transition into an enhanced listening state in which the audio data may be monitored for enhanced hot word(s). Detection of enhanced hot word(s) triggers the automated assistant to perform a responsive action without requiring detection of default hot word(s).

18 Claims, 8 Drawing Sheets

(58) Field of Classification Search
CPC ......... G10L 17/00; G10L 17/10; G06F 40/30; G06F 40/167
See application file for complete search history.

(56) References Cited

U.S. PATENT DOCUMENTS

| | | | |
|---|---|---|---|
| 8,719,039 | B1 | 5/2014 | Sharifi |
| 8,768,707 | B2 | 7/2014 | Mozer |
| 9,263,042 | B1 | 2/2016 | Sharifi |
| 9,318,107 | B1 | 4/2016 | Sharifi |
| 9,361,885 | B2 | 6/2016 | Ganong, III et al. |
| 9,373,321 | B2 | 6/2016 | Bapa et al. |
| 9,536,528 | B2 | 1/2017 | Rubin et al. |
| 9,542,941 | B1 | 1/2017 | Weksler et al. |
| 9,548,047 | B2 | 1/2017 | Clark et al. |
| 9,721,563 | B2 | 8/2017 | Naik |
| 9,792,907 | B2 | 10/2017 | Bocklet et al. |
| 9,858,925 | B2 | 1/2018 | Gruber et al. |
| 9,886,953 | B2 | 2/2018 | Lemay et al. |
| 9,892,729 | B2 | 2/2018 | Yun et al. |
| 10,586,534 | B1* | 3/2020 | Argyropoulos ......... G10L 15/22 |
| 2008/0167868 | A1* | 7/2008 | Kanevsky ............... G10L 15/24 704/233 |
| 2014/0274203 | A1 | 9/2014 | Ganong, III et al. |
| 2015/0053779 | A1* | 2/2015 | Adamek ............ F24D 19/1084 236/1 C |
| 2015/0262577 | A1 | 9/2015 | Nomura |
| 2016/0077794 | A1* | 3/2016 | Kim ...................... G06F 3/167 704/275 |
| 2017/0116986 | A1* | 4/2017 | Weng ...................... G10L 15/22 |
| 2017/0193996 | A1 | 7/2017 | Zurek et al. |
| 2018/0053507 | A1 | 2/2018 | Wang et al. |
| 2018/0108343 | A1 | 4/2018 | Stevans et al. |
| 2018/0173494 | A1* | 6/2018 | Choi ...................... G06N 20/00 |
| 2018/0182390 | A1 | 6/2018 | Hughes et al. |
| 2018/0260189 | A1 | 9/2018 | Li |
| 2018/0338109 | A1 | 11/2018 | Badr et al. |
| 2019/0198012 | A1* | 6/2019 | Zhang ..................... G10L 15/22 |
| 2019/0206412 | A1* | 7/2019 | Li ........................ H04L 12/2816 |
| 2019/0341031 | A1* | 11/2019 | Cox ........................ G10L 15/26 |
| 2020/0047687 | A1* | 2/2020 | Camhi .................... G10L 15/22 |

OTHER PUBLICATIONS

Kepuska, et al."A novel wake-up-word speech recognition system, wake-up-word recognition task, technology and evaluation." Non-linear Analysis: Theory, Methods & Applications 71, No. 12 (2009): e2772-e2789.

Trollop, R. "7 Things You Didn't Know About Wake Words". [https://medium.com/@rowantrollope/7-things-you-didnt-know-about-wake-words-d4e9e041d11d [retrieved Jul. 16, 2018] 7 pages.

European Patent Office; International Search Report and Written Opinion of Ser No. PCT/US2018/047281; 12 pages; dated May 20, 2019.

Intellectual Property India; Examination Report issued in Application No. 202027053421; 5 pages; dated Jul. 27, 2021.

European Patent Office; Intention to Grant issued in Application No. 18773684.8; 52 pages; dated Oct. 7, 2021.

* cited by examiner

DYNAMIC AND/OR CONTEXT-SPECIFIC HOT WORDS TO INVOKE AUTOMATED ASSISTANT

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," "virtual assistants," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input.

In many cases, before the automated assistant can interpret and respond to a user's request, it must first be "invoked," e.g., using predefined oral invocation phrases that are often referred to as "hot words" or "wake words." Thus, many automated assistants operate in what will be referred to herein as a "limited hot word listening state" or "default listening state" in which they are always "listening" to audio data sampled by a microphone for a limited (or finite, or "default") set of hot words. Any utterances captured in the audio data other than the default set of hot words are ignored. Once the automated assistant is invoked with one or more of the default set of hot words, it may operate in what will be referred to herein as a "speech recognition state" wherein for at least some time interval after invocation, the automated assistant performs speech-to-text ("STT") processing of audio data sampled by a microphone to generate textual input, which in turn is semantically processed to determine a user's intent (and to fulfill that intent).

Operating the automated assistant in the default listening state provides a variety of benefits. Limiting the number of hot words being "listened for" allows for conservation of power and/or computing resources. For example, an on-device machine learning model may be trained to generate output that indicates when one or more hot words are detected. Implementing such a model may require only minimal computing resources and/or power, which is particularly beneficial for assistant devices that are often resource-constrained. Storing such a trained model locally on a client device also provides advantages relating to privacy. For example, most users do not want STT processing to be performed on everything they say within earshot of a computing device operating an automated assistant. Additionally, the on-device model also prevents data indicative of user utterances that are not intended to be processed by the automated assistant from being provided to a semantic processor, which often operates at least in part on the cloud.

Along with these benefits, operating the automated assistant in the limited hot word listening state also presents various challenges. To avoid inadvertent invocation of the automated assistant, hot words are typically selected to be words or phrases that are not often uttered in everyday conversation (e.g., "long tail" words or phrases). However, there are various scenarios in which requiring users to utter long tail hot words before invoking an automated assistant to perform some action can be cumbersome. Some automated assistants may provide an option for a "continued listening" mode after a user utters a command, so that the user need not "reawaken" the automated assistant with hot word(s) before performing a subsequent command. However, transitioning the automated assistant into a continued listening mode means that the automated assistant may be performing far more STT processing for far more utterances, potentially wasting power and/or computing resources. Additionally, and as noted above, most users prefer that only utterances addressed to the automated assistant are STT processed.

SUMMARY

Techniques are described herein for enabling the use of "dynamic" hot words for an automated assistant. Under various circumstances, an automated assistant configured with selected aspects of the present disclosure can more intelligently listen for particular context-specific hot words, sometimes embodied in what will be referred to herein as an "enhanced" set of hot words. In various implementations, the automated assistant may listen for these context-specific hot words either in addition to, or instead of, the default hot words used to invoke the automated assistant. Put another way, in various implementations, an automated assistant configured with selected aspects of the present disclosure may expand or alter, at least temporarily, its hot word vocabulary in certain circumstances.

In various implementations, dynamic hot words may be selectively enabled under a variety of different circumstances, such as a user being sufficiently proximate to an assistant device, or a user being recognized based on their appearance, voice, and/or other identifying characteristics. These other identifying characteristics may include, for instance, an RFID badge, visual indicia, a uniform, a piece of flair, a user's size (which could indicate the user is an adult), a physical impairment that might affect a user's ability to communicate orally and/or via convention user inputs (e.g., mouse, touchscreen, etc.), and so forth.

As an example, in some implementations, if a user is detected by a proximity sensor, e.g., within a predetermined proximity of a computing device usable to engage with an automated assistant, one or more additional hot words may be activated to enable the proximate user to more easily invoke the automated assistant. In some implementations, the closer the user is to the assistant device, the more dynamic hot words may be activated. For example, a user detected within three meters of the assistant device may activate a first set of dynamic hot words. If the user is detected in closer proximity, e.g., within one meter, additional or alternative hot words may be activated.

As another example, in some implementations, one or more dynamic hot words that are associated with (e.g., custom to) the user, such as hot words the user manually selected or input, may be downloaded and/or "activated." The user may then utter one or more of these custom hot words to invoke the automated assistant, without uttering one or more of the default set of hot words that are usable by people generally to invoke the automated assistant.

In some implementations, dynamic hot words may be activated based on some combination of proximity and recognition. This may be particularly beneficial in a noisy and/or crowded environment. For example, any number of other people in such an environment might also be trying to interact with an automated assistant using default hot words that might be relatively standardized. To avoid inadvertent activation of the automated assistant by other people, when the user is sufficiently close to an assistant device (e.g., holding her smart phone or wearing her smart watch, e.g., a snap or fastener being engaged may be detected and trigger activation of an enhanced set of hot words) and recognized, the automated assistant may cease listening for the standard or default hot words, and may instead listen for custom hot words that are tailored to the particular user. Or, in the alternative, the automated assistant may continue to listen for the default hot words, but may raise a confidence threshold required for invocation based on those default hot words, while activating or lowering a threshold associated with the custom hot words.

As another example, in some implementations, dynamic hot words may be associated with a group of people (e.g., employees, gender, age range, share a visual characteristic, etc.), and may be activated one or more of those people is detected and/or recognized. For example, a group of people may share a visual characteristic. In some implementations, when one or more of these visual characteristics are detected by one or more hardware sensors of an assistant device, one or more dynamic hot words may be activated that might not otherwise be available to non-group-members.

Hot words may be detected by or on behalf of automated assistants in various ways. In some implementations, a machine learning model such as a neural network may be trained to detect an ordered or unordered sequence of one or more hot words in an audio data stream. In some such implementations, a separate machine learning model may be trained for each applicable hot word (or "hot phrase" containing multiple hot words).

In some implementations, machine learning models trained to detect these dynamic hot words may be downloaded as needed. For example, suppose a particular user is identified, e.g., based on facial recognition processing performed on one or more images captured of the user or speech recognition processing performed on audio data generated from the user's speech. If not already available on-device, these models may be downloaded, e.g., from the cloud based on the user's online profile.

In some implementations, to improve the user experience and decrease latency, responsive actions that are meant to be performed by the automated assistant upon detection of context specific hot words may be pre-cached at a device at which a user is engaged with the automated assistant. That way, as soon as the context-specific hot word is detected, the automated assistant can take immediate action. This is in contrast to where the automated assistant first might need to conduct a round trip network communication with one or more computing systems (e.g., the cloud) to fulfill the user's request.

Techniques described herein give rise to a variety of technical advantages. Expanding or altering the vocabulary that is available to invoke an automated assistant under certain circumstances, at least temporarily, may reduce the need to first invoke the automated assistant before causing it to perform some contextually relevant action, such as stopping a timer, pausing music, etc. Some existing assistant devices make it easy to pause media playback or stop a timer by allowing a user to simply tap on an active portion (e.g., a capacitive touchpad or display) of a surface of the device, without having to invoke the automated assistant first. However, users with physical disabilities and/or users who are otherwise occupied (e.g., cooking, driving, etc.) may not be able to easily touch the device. Accordingly, techniques described herein enable those users to more easily and quickly cause the automated assistant to perform some responsive action, such as stopping a timer, without invoking it first.

Additionally, as described herein, in some implementations, the automated assistant may proactively download content that is responsive to context-specific hot words. For example, suppose a user tends to repeat particular requests, such as "what's the weather forecast today?", "what's on my schedule?", etc. Information responsive to these requests may be preemptively downloaded and cached in memory, and the commands (or portions thereof) may be used to activate particular dynamic hotwords. Consequently, when the one or more hot words are uttered, the automated assistant is able to provide the responsive information more quickly than if the automated assistant had to first perform reach out over one or more networks to one or more remote resources to obtain the responsive information. This may also be beneficial when the assistant device is in a vehicle that may travel in/out of zones in which data network(s) are available. By preemptively downloading and caching content responsive to certain context-specific hot words, e.g., while the vehicle is in a data coverage zone, that data is then available if the user requests it while travelling outside of a data coverage zone.

As yet another example, techniques described herein may enable users to trigger responsive actions without requiring comprehensive speech-to-text ("STT") processing. For example, when certain contextual invocation models are activated and detect context-specific hot words, responsive action(s) may be triggered based on the output of these models, without requiring the user's utterance to be converted to text using STT processing. This may conserve computing resources on the client device, and/or may avoid a round-trip communication with cloud infrastructure to conduct STT and/or semantic processing of the user's utterance, which conserves network resources. Also, avoiding the round-trip transmission may improve latency and avoid sending at least some data to the cloud infrastructure, which may be advantageous and/or desirable from a user privacy standpoint.

In some implementations, a method performed by one or more processors is provided that includes: executing an automated assistant in a default listening state, wherein the automated assistant is executed at least in part on one or more computing devices operated by a user; while in the default listening state, monitoring audio data captured by one or more microphones for one or more of a default set of one or more hot words, wherein detection of one or more of the hot words of the default set triggers transition of the automated assistant from the default listening state into a speech recognition state; detecting one or more sensor signals generated by one or more hardware sensors integral with one or more of the computing devices; analyzing the one or more sensor signals to determine an attribute of the user; based on the analysis, transitioning the automated assistant from the default listening state into an enhanced listening state; and while in the enhanced listening state, monitoring the audio data captured by one or more of the microphones for one or more of an enhanced set of one or more hot words, wherein detection of one or more of the hot words of the enhanced set triggers the automated assistant to perform a responsive action without requiring detection of one or more of the hot words of the default set, and wherein one or more of the hot words of the enhanced set is not in the default set.

These and other implementations of technology disclosed herein may optionally include one or more of the following features.

In various implementations, the one or more hardware sensors may include a proximity sensor, and the attribute of the user may include: the user being detected by the proximity sensor, or the user being detected by the proximity sensor within a predetermined distance of one or more of the computing devices.

In various implementations, the one or more hardware sensors may include a camera. In various implementations, the attribute of the user may include: the user being detected by the camera, or the user being detected by the camera within a predetermined distance of one or more of the computing devices. In various implementations, the analyzing may include facial recognition processing. In various implementations, the attribute of the user may include an identity of the user. In various implementations, the attribute of the user may include membership of the user in a group.

In various implementations, the one or more hardware sensors may include one or more of the microphones. In various implementations, the one or more attributes may include the user being audibly detected based on audio data generated by one or more of the microphones. In various implementations, the analyzing may include voice recognition processing. In various implementations, the attribute of the user may include an identity of the user. In various implementations, the attribute of the user may include membership of the user in a group.

In various implementations, the responsive action may include transitioning the automated assistant to the speech recognition state. In various implementations, the responsive action may include the automated assistant performing a task requested by the user with one or more of the hot words of the enhanced set.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
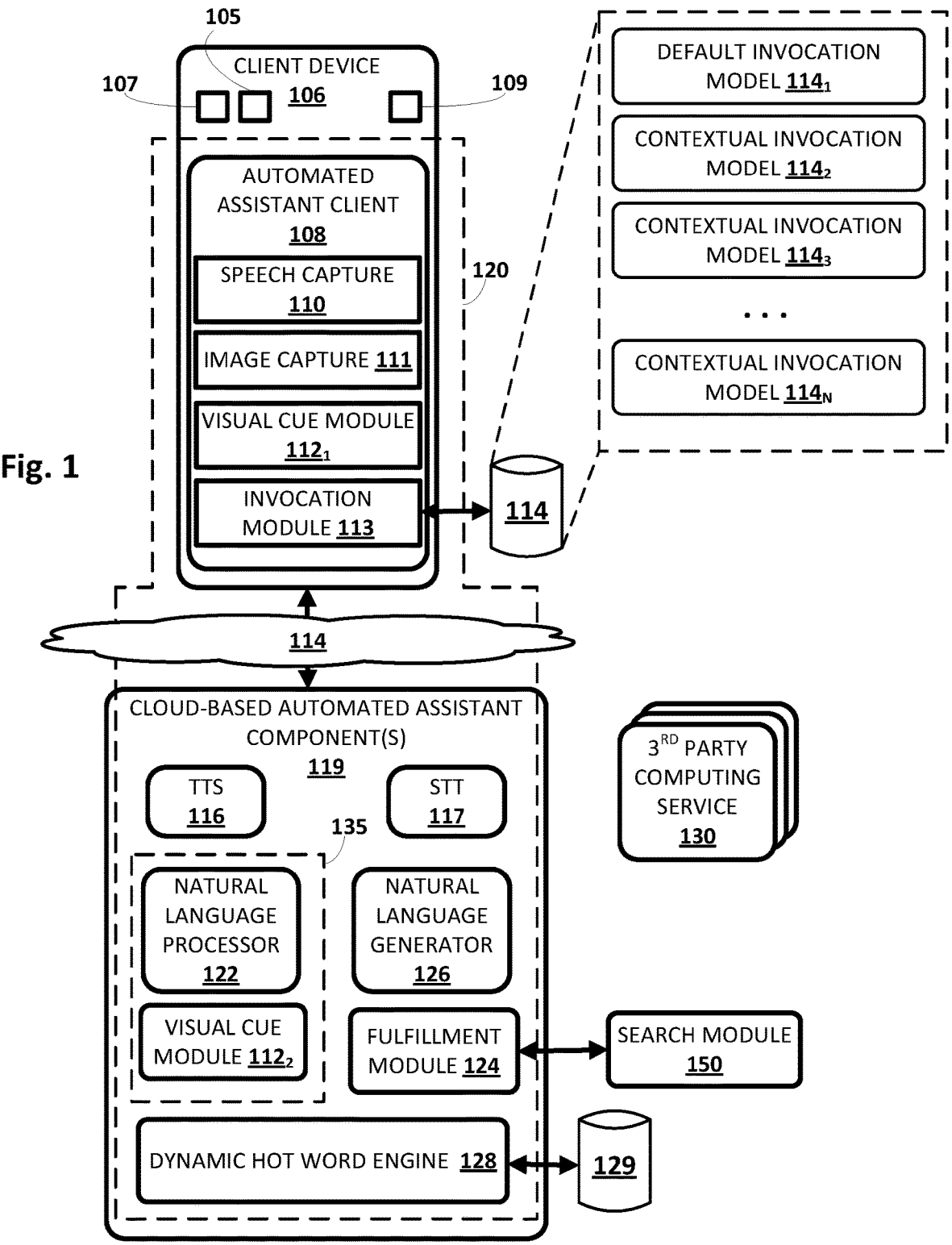
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to take various actions.

Additionally or alternatively, in some implementations, client device 106 may include one or more proximity sensors 105. Proximity sensor(s) may take various forms, such as passive infrared ("PIR") sensors, radio frequency identification ("RFID"), a component that receives a signal emitted from another nearby electronic component (e.g., Bluetooth signal from a nearby user's client device, high- or low-frequency sounds emitted from the devices, etc.), and so forth. Additionally or alternatively, vision sensors 107 and/or a microphone 109 may also be used as proximity sensors, e.g., by visual and/or audibly detecting that a user is proximate.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant," to cause automated assistant 120 to begin actively listening or monitoring typed text. Additionally or alternatively, in some implementations, automated assistant 120 may be invoked based on one or more detected visual cues, alone or in combination with oral invocation phrases.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, a visual cue module $112_1$, and/or an invocation module 113. In other implementations, one or more aspects of speech capture module 110, image capture module 111, visual cue module 112, and/or invocation module 113 may be implemented separately from automated assistant client 108, e.g., by one or more cloud-based automated assistant components 119. For example, in FIG. 1, there is also a cloud-based visual cue module $112_2$ that may detect visual cues in image data.

In various implementations, speech capture module 110, which may be implemented using any combination of hardware and software, may interface with hardware such as a microphone 109 or other pressure sensor to capture an audio recording of a user's utterance(s). Various types of processing may be performed on this audio recording for various purposes. In some implementations, image capture module 111, which may be implemented using any combination of hardware or software, may be configured to interface with camera 107 to capture one or more image frames (e.g., digital photographs) that correspond to a field of view of the vision sensor 107.

In various implementations, visual cue module $112_1$ (and/or cloud-based visual cue module $112_2$) may be implemented using any combination of hardware or software, and may be configured to analyze one or more image frames provided by image capture module 111 to detect one or more visual cues captured in and/or across the one or more image frames. Visual cue module $112_1$ may employ a variety of techniques to detect visual cues. For example, Visual cue module $112_2$ may use one or more artificial intelligence (or machine learning) models that are trained to generate output indicative of detected user-provided visual cues in image frames.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, in some cases, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

In various implementations, invocation module 113 may be configured to determine whether to invoke automated assistant 120, e.g., based on output provided by speech capture module 110 and/or visual cue module $112_1$ (which in some implementations may be combined with image capture module 111 in a single module). For example, invocation module 113 may determine whether a user's utterance qualifies as an invocation phrase that should initiate a human-to-computer dialog session with automated assistant 120. In some implementations, invocation module 113 may analyze data indicative of the user's utterance, such as an audio recording or a vector of features extracted from the audio recording (e.g., an embedding), alone or in conjunction with one or more visual cues detected by visual cue module $112_1$. In some implementations, a threshold that is employed by invocation module 113 to determine whether to invoke automated assistant 120 in response to a vocal utterance may be lowered when particular visual cues are also detected. Consequently, even when a user provides a vocal utterance that is different from but somewhat phonetically similar to the proper invocation phrase, "OK assistant," that utterance may nonetheless be accepted as a proper invocation when detected in conjunction with a visual cue (e.g., hand waving by the speaker, speaker gazes directly into vision sensor 107, etc.).

In some implementations, one or more on-device invocation models, e.g., stored in an on-device model database 114, may be used by invocation module 113 to determine whether an utterance and/or visual cue(s) qualify as an invocation. Such an on-device invocation model may be trained to detect variations of invocation phrases/gestures. For example, in some implementations, the on-device invocation model (e.g., one or more neural networks) may be trained using training examples that each include an audio recording (or an extracted feature vector) of an utterance from a user, as well as data indicative of one or more image frames and/or detected visual cues captured contemporaneously with the utterance.

In FIG. 1, on-device model database 114 may store one or more on-device invocation models $114_1$-$114_N$. In some implementations, a default on-device invocation model $114_1$ may be trained to detect, in an audio recording or other data indicative thereof, one or more default invocation phrases or hot word(s), such as those mentioned previously (e.g., "OK Assistant," "Hey, Assistant," etc.). In some such implementations, these models may always be available and usable to transition automated assistant 120 into a general listening state in which any audio recording captured by speech capture module 110 (at least for some period of time following invocation) may be processed using other components of automated assistant 120 as described below (e.g., on client device 106 or by one or more cloud-based automated assistant components 119).

Additionally, in some implementations, on-device model database 114 may store, at least temporarily, one or more additional "contextual invocation models" $114_2$-$114_N$. These contextual invocation models $114_2$-$114_N$ may be used by and/or available to (e.g., activated) invocation module 113 in specific contexts. Contextual invocation models $114_2$-$114_N$ may be trained to detect, e.g., in an audio recording or other data indicative thereof, one or more context-specific hot words. In some implementations, contextual invocation models $114_2$-$114_N$ may be selectively downloaded on an as-needed basis, e.g., from a dynamic hot word engine 128 that forms part of cloud-based automated assistant components 119, as will be described in more detail below.

In various implementations, when invocation module 113 detects various dynamic hot words using contextual invocation models $114_2$-$114_N$, it may transition automated assistant 120 into the general listening state described previously. Additionally or alternatively, invocation module 113 may transition automated assistant 120 into a context-specific state in which one or context-specific responsive actions are performed with or without transitioning automated assistant 120 into the general listening state. In many cases, the audio data that triggered transition of automated assistant 120 into a context-specific state may not be transmitted to the cloud. Instead, one or more context-specific responsive actions may be performed entirely on client device 106, which may reduce both the response time and the amount of information that is transmitted to the cloud, which may be beneficial from a privacy standpoint.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast]

today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected by visual cue modules $112_{1-2}$. For example, a user could utter something like "Order me this many cat bowls" while holding up three fingers to visual sensor 107 of client device 106. Or, a user could utter something like "Find me more movies like this" while holding of a DVD case for a particular movie.

In some implementations, automated assistant 120 may serve as an intermediary between users and one or more third party computing services 130 (or "third party agents", or "agents"). These third party computing services 130 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 130. For example, automated assistant 120 may provide access to an application programming interface ("API") to a service for controlling a smart device. A user may invoke automated assistant 120 and provide a command such as "I'd like to turn the heating on." Intent matcher 135 may map this command to a grammar that triggers automated assistant 120 to engage with the third party service, thereby to cause the user's heating to be switched on. The third party service 130 may provide automated assistant 120 with a minimum list of slots that need to be filled in order to fulfill (or "resolve") a command to turn the heating on. In this example, the slots may include the temperature to which the heating is to be set, and a duration for which the heating is to be on. Automated assistant 120 may generate and provide to the user (via client device 106) natural language output that solicits parameters for the slots.

Fulfillment module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIGS.) 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2:
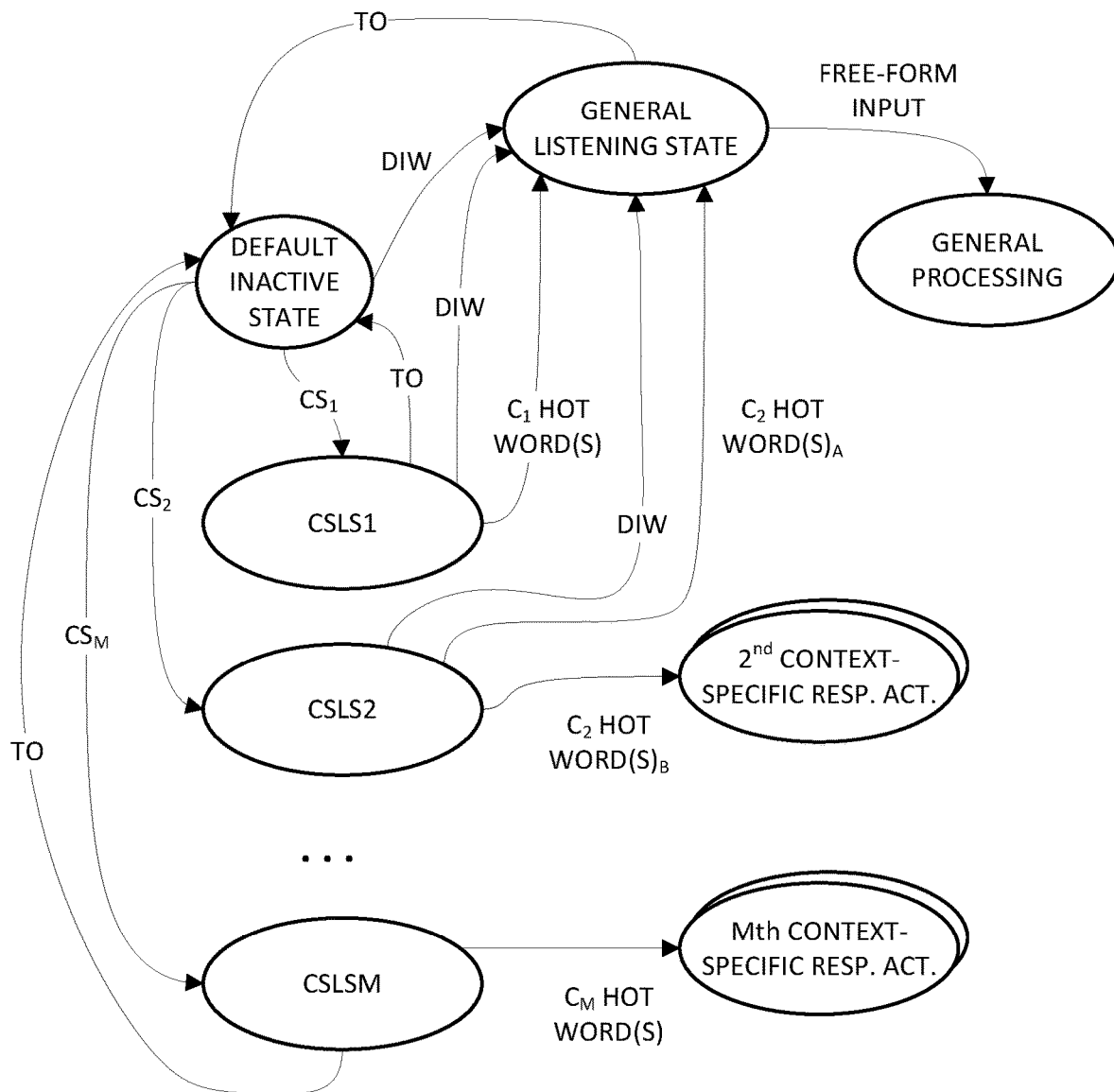
FIG. 2 depicts an example of a state machine that may be implemented by an automated assistant configured with selected aspects of the present disclosure, in accordance with various implementations.

FIG. 2 schematically depicts an example state machine that may be implemented by an automated assistant (e.g., 120) and/or an assistant device (e.g., 106) configured with selected aspects of the present disclosure, in accordance with various implementations. At top left is a "default inactive state" in which automated assistant 120 may reside when not being engaged by a user. In the default inactive state, one or more microphones of one or more client devices (106) may be activated, and audio data it captures may be analyzed using techniques described herein. Automated assistant 120 may be transitioned into a "general listening state" in response to detection, e.g., by invocation module 113 and/or visual cue module 112 based on default invocation model $114_1$, of one or more default invocation words ("DIW" in FIG. 2, also referred to herein as "hot words"), such as "OK, Assistant," or "Hey, Assistant." Utterances other than the default hot words (e.g., ambient conversation, etc.) may be ignored and not processed.

In the general listening state, automated assistant 120 may capture audio data uttered after the default invocation word(s) and transition into a "general processing" state. In the general processing state, automated assistant 120 may process data indicative of audio input as described previously with respect to FIG. 1, including STT processing, natural language processing, intent matching, fulfillment, etc. Once the processing is complete, automated assistant 120 may transition back into the default inactive state. If no audio input is received after detection of the default invocation word(s), then a timeout ("TO" in FIG. 2) may transition automated assistant 120 from the general listening state back into the default inactive state, e.g., so that later utterances not intended for processing by automated assistant are not captured or processed.

As noted previously, techniques described herein facilitate context-specific hot words that can be activated and detected to transition automated assistant 120 to a variety of different states, such as the general listening state or to other context-specific states in which automated assistant 120 performs various actions. In some implementations, in certain contexts, the vocabulary of invocation words that can be uttered to transition automated assistant 120 from the default inactive state to the general listening state may be expanded, at least temporarily (e.g., for a limited amount of time, until the context is no longer applicable, etc.).

For example, in FIG. 2, a first context-specific signal $CS_1$ may transition automated assistant 120 from the default inactive state into a first context-specific listening state, "CSLS1." In CSLS1, automated assistant 120 may listen for both default invocation word(s) ("DIW") and first context-specific hot words ("$C_1$ hot words"). If either are detected, automated assistant 120 may transition to the general listening state as described above. Thus, in the first context-specific listening state, the vocabulary of hot words that will transition automated assistant 120 into the general listening state is expanded to include both the default invocation word(s) and the first context-specific hot words. Also, in some implementations, if a sufficient amount of time passes while automated assistant 120 is in the first context-specific listening state without detection of activated hot words, then a timeout ("TO") may transition automated assistant 120 back into the default inactive state.

Additionally or alternatively, in some implementations, in certain contexts, automated assistant 120 may be transitionable into either the general listening state, e.g., using an expanded vocabulary of hot words, or into a context-specific state in which one or context-specific actions may be performed. For example, in FIG. 2, automated assistant 120 may be transitioned from the default inactive state into a second context-specific listening state, "CSLS2," in response to a second contextual signal ("$CS_2$"). In this second context-specific listening state, automated assistant 120 may be transitioned to the general listening state, e.g., by detecting one or more default invocation words and/or in some cases, one or more second context-specific hot words ("C2 hot word(s)$_A$") that effectively expand the vocabulary that is usable to transition automated assistant 120 into the general listening state.

Additionally or alternatively, automated assistant 120 may be transitioned from the second context-specific state ("CSLS2") into one or more states in which one or more second context-specific responsive actions ("$2^{nd}$ context-specific resp. act.") are performed, e.g., in response to one or more additional second context-specific hot words ("C2 hot word(s)$_B$"). Example responsive actions will be described below. In some implementations, specific second-context specific hot words may be mapped to specific second-context specific responsive actions, though this is not required. Although not depicted in FIG. 2 for the sake of clarity, in some implementations, after performance of these one or more second context-specific responsive actions, automated assistant 120 may transition back into the default inactive state.

In some implementations, in certain contexts, automated assistant 120 may no longer listen for the default hot words. Instead, automated assistant 120 may only listen for context-specific hot words and perform responsive actions. For example, in FIG. 2, automated assistant 120 may be transitioned from the default inactive state into an Mth context-specific listening state (M is a positive integer), "CSLSM," in response to an Mth contextual signal ("$CS_M$"). In this state, automated assistant 120 may listen for Mth context-specific hot words ("$C_M$ hot word(s)"). In response to detecting one or more Mth context-specific hot words, automated assistant 120 may perform one or more Mth context-specific responsive actions ("Mth context-specific resp. act.").

In various implementations, automated assistant 120 may activate context-specific hot words in various ways. For example, and referring to both FIGS. 1 and 2, in some implementations, upon transition into a specific context, automated assistant 120 may download, e.g., from dynamic hot word engine 128, one or more context-specific machine learning models or classifiers (e.g., $114_2, 114_3, \ldots, 114_N$), such as neural networks, hidden Markov models, etc., that are pre-trained to detect hot words that are to be activated in that particular context. For example, suppose that in a particular context, a vocabulary that transitions automated assistant 120 from the default inactive state to the general listening state is expanded to include the word, "howdy." In various implementations, automated assistant 120 may obtain, e.g., from a database 129 available to dynamic hot word engine 128, a classifier that is trained to generate output indicative of whether the word "howdy" was detected. In various implementations this classifier may be binary (e.g., output "1" if the hot word is detected, "0" otherwise), or may generate a probability. If the probability satisfies some confidence threshold, then the hot word may be detected.

Additionally or alternatively, in some implementations, one or more on-device models 114 may take the form of a dynamic hot word classifier/machine learning model (e.g., a neural network, hidden Markov model, etc.) that is tunable on the fly to generate one output for one or more predetermined phonemes, and to generate another output for other phonemes. Suppose the hot word "howdy" is to be activated. In various implementations, the dynamic hot word classifier may be tuned, e.g., by altering one or more parameters and/or providing specific input alongside or embedded with the audio data, to "listen" for the phonemes "how" and "dee." When those phonemes are detected in audio input, the dynamic hot word classifier may generate output that triggers automated assistant 120 to take responsive action, such as transitioning into the general listening state, performing some context-specific responsive action, etc. Other phonemes may generate output that is ignored or disregarded. Additionally or alternatively, output may be generated by the dynamic hot word classifier only in response to activated phonemes, and other phonemes may not generate output at all.

Figure 3A:
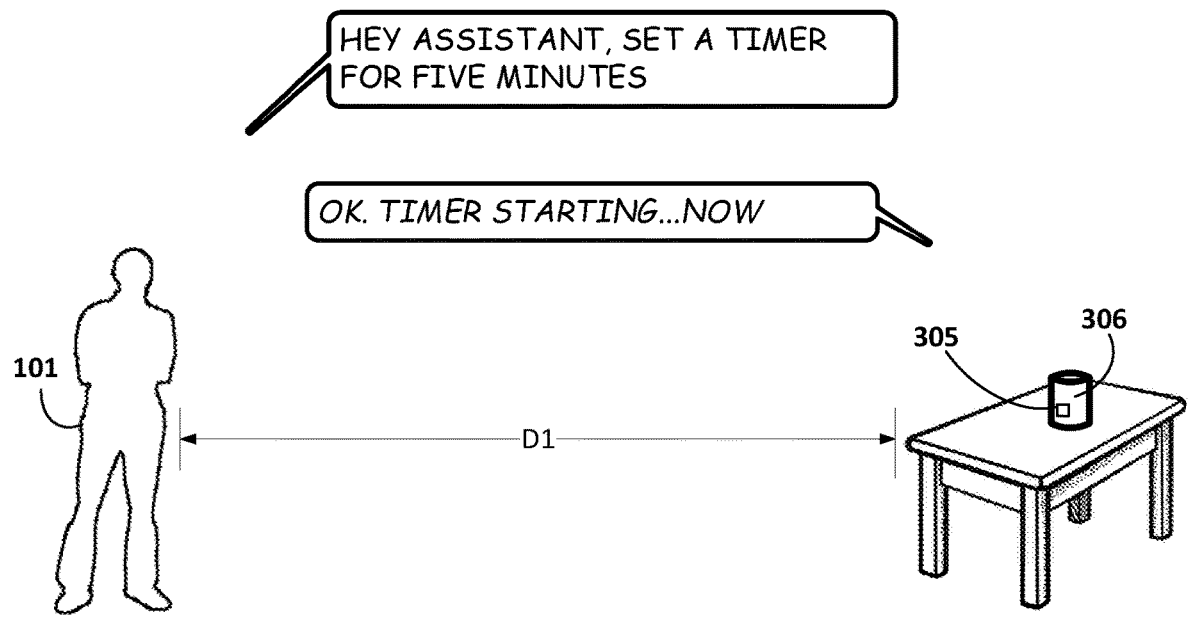
FIGS. 3A, 3B, 4A, 4B, and 5 depict additional example scenarios in which disclosed techniques may be employed.
Figure 3B:
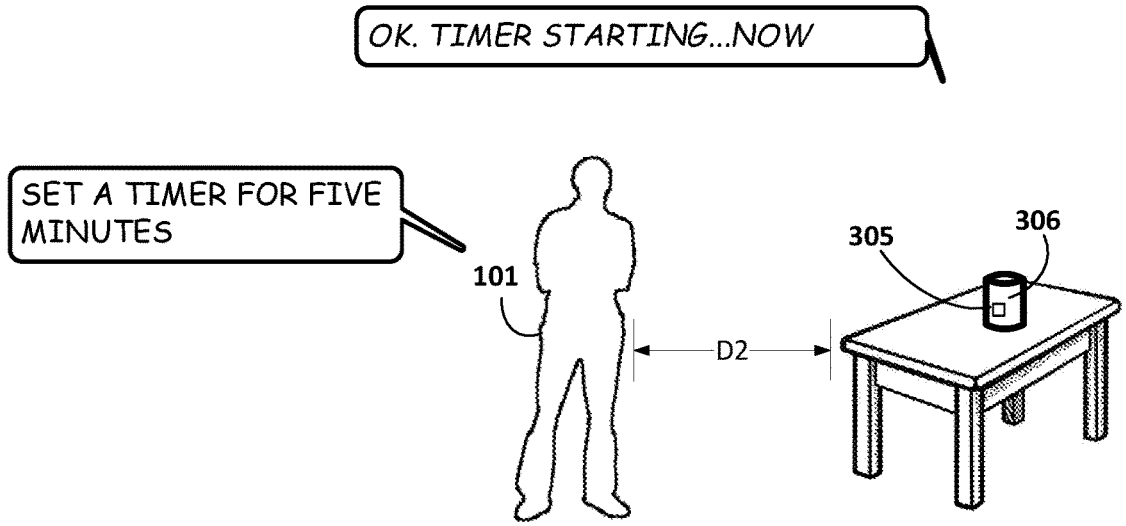

FIGS. 3A and 3B demonstrate one example of how a human-to-computer dialog session between user 101 and an instance of automated assistant (not depicted in FIGS.

3A-B) may occur, via the microphone(s) and speaker(s) of a client computing device 306 (depicted as a standalone interactive speaker but this is not meant to be limiting) according to implementations described herein. One or more aspects of automated assistant 120 may be implemented on the computing device 306 and/or on one or more computing devices that are in network communication with the computing device 306. Client device 306 includes a proximity sensor 305, which as noted above can take the form of a camera, microphone, PIR sensor, wireless communication component, etc.

In FIG. 3A, client device 306 may determine, based on a signal generated by proximity sensor 305, that user 101 is located a distance D1 from client device 306. Distance D1 may be greater than a predetermined distance (e.g., a threshold). Consequently, automated assistant 120 may remain in the default listening state in which it can only be invoked (at least vocally) using one or more of a default set of hot words. In FIG. 3A, for instance, user 101 provides natural language input of "Hey assistant, set a timer for five minutes". "Hey Assistant" may include default hot word(s) that, together, form a valid "invocation phrase" that is usable to invoke automated assistant 120. Accordingly, automated assistant 120 replies, "OK. Timer starting . . . now" and initiates a five-minute timer.

By contrast, in FIG. 3B, client device 306 may detect, e.g., based on a signal generated by proximity sensor 305, that user 101 is now at a distance D2 from client device. Distance D2 may be less than the predetermined distance (or threshold). Consequently, automated assistant 120 may transition from the default listening state of FIG. 3A to an enhanced listening state. Put another way, the determination that user 101 is D2 away may constitute a contextual signal (e.g., "CS1" in FIG. 2) that causes automated assistant 120 to transition into a context-specific state in which additional or alternative hot words are activated and available to cause automated assistant 120 to transition from the default listening state to the enhanced listening state.

While in the enhanced listening state, user 101 may be able to invoke automated assistant 120 using one or more hot words from an enhanced set of hot words, in addition to or instead of the default set of hot words. In FIG. 3B, for instance, user 101 does not need to begin his utterance with "Hey Assistant." Instead, user simply says, "set a timer for five minutes". Words such as "set" or phrases such as "set a timer for" may include hot words that are part of the enhanced set of hot words that are now usable to invoke automated assistant 120. Consequently, automated assistant 120 replies, "OK. Timer starting . . . now" and initiates a five-minute timer.

In this example, automated assistant 120 was transitioned from the default listening state to one context-specific state in which automated assistant 120 can be invoked using additional/alternative hot words. However, automated assistant 120 may be transitioned into additional or alternative states in response to such an event. For example, in some implementations, when user 101 is detected sufficiently close to an assistant device (e.g., D2), automated assistant 120 may transition into another context-specific state. For example, automated assistant 120 may transition into a context-specific state in which comprehensive speech recognition is not available (at least without first invoking automated assistant 120 with default hot word(s)), but in which other, context-specific commands are available.

For example, suppose user 101 is in the kitchen preparing dinner according to an online recipe that has been accessed by automated assistant 120 operating at least in part on client device 306. Suppose further that client device 306 is situated in a cooking area such that user 101 performs steps of the recipe within D2 of client device 306. In some implementations, the fact that user 101 has been detected with D2 of client device 306 may cause automated assistant 120 to transition into a context-specific state in which at least some commands are available without first invoking automated assistant 120 using default hot words. For example, user 101 could utter "next" to go to the next step of the recipe, or "back" or "repeat last step" to hear the previous step, "start a timer," "stop a timer," etc.

In some implementations, other actions might also be available in this context. For example, in some implementations, multiple assistant devices (e.g., forming a coordinated ecosystem of client devices) deployed around a household may each be associated with a particular room. Association with a particular room may cause different dynamic hot words to become activated when someone is sufficiently close to that device. For example, when user 101 first sets up client device 306 in a kitchen, user 101 may designate client device 306 as being located in the kitchen, e.g., by selecting the kitchen on a menu. This may activate a kitchen-specific state machine of automated assistant 120 that activates certain kitchen-centric hot words when a user is sufficiently proximate to the client device. Thus, when user 101 is within D2 of client device 306 in the kitchen, certain kitchen-related commands, such as "set a timer," "go to the next step," commands to operate smart kitchen appliances, etc., may become active without user 101 first having to invoke automated assistant 120 with default hot words.

In this proximity example, user 101 had to be detected within D2 of client device 306, but this is not meant to be limiting. In various implementations, it may suffice that user 101 is simply detected by proximity sensor 305. For example, a PIR sensor may only detect a user's presence when they are relatively close.

Figure 4A:
Figure 4B:

In addition to or instead of proximity, in some implementations, a user's identity and/or membership in a group may be determined and used to activate one or more dynamic hot words. FIGS. 4A-B depict one such example. Once again users (101A in FIG. 4A, 101B in FIG. 4B) engage with automated assistant 120 that operates at least in part on client device 406. Client device 406 includes a sensor 470 that generates a signal that is usable to determine user identities. Thus, sensor 470 could be one or more cameras configured to generate visual data that can be analyzed using facial recognition processing, or even object recognition process that is capable of identifying visual traits, such as a uniform, visual indicia (e.g., QR code on a badge or shirt), to identify a user (or that a user is a member of a group). Additionally or alternatively, sensor 470 could be one or more microphones configured to perform speech recognition (sometimes referred to as "speaker recognition") on one or more utterances made by user 101. As yet another option, sensor 470 could be a wireless receiver (e.g., Bluetooth, Wi-Fi, Zigbee, Z-wave, ultrasonic, RFID, etc.) that receives a wireless signal from a device (not depicted) carried by a user and analyzes that wireless signal to determine an identity of the user.

In FIG. 4A, user 101A is not identifiable. Accordingly, user 101A is required to use one or more default hot words to invoke automated assistant 120. In FIG. 4A, user 101A utters, "Hey assistant, play 'We Wish You a Merry Christmas." In response to "Hey assistant," automated assistant 120 is invoked. The remainder of the utterance is processed using the pipeline described previously to cause automated assistant 120 to initiate playback of the song on client device 406.

By contrast, in FIG. 4B, user 101B is identified, e.g., based on a signal generated by sensor 470. The act of identifying user 101B may constitute a contextual signal (e.g., "CS1" in FIG. 2) that causes automated assistant to transition into a context-specific state in which additional or alternative hot words are activated and available to cause automated assistant 120 to transition from the default listening state to the enhanced listening state. For example, as shown in FIG. 4B, user 101B may utter something like "Play 'We Wish You a Merry Christmas" without first invoking automated assistant 120. Nonetheless, automated assistant 120 initiates playback of the song. Other hot words that may be active in such a context include but are not limited to "fast forward," "skip ahead <number seconds>," "stop," "pause," "rewind <time increment>," "turn up/down the volume," etc.

Additionally or alternatively, it may not be necessary to detect the particular identity of user 101B. In some implementations, it may suffice to recognize some visual attribute of a user to activate certain dynamic hot words. For example, in FIG. 4B, user 101B is a doctor wearing clothing typically worn by doctors. This clothing (or a badge having indicia, RFID, etc.) may be detected and used to determine that user 101B is a member of a group (e.g., medical personnel) for which certain hot words should be activated.

Figure 5:
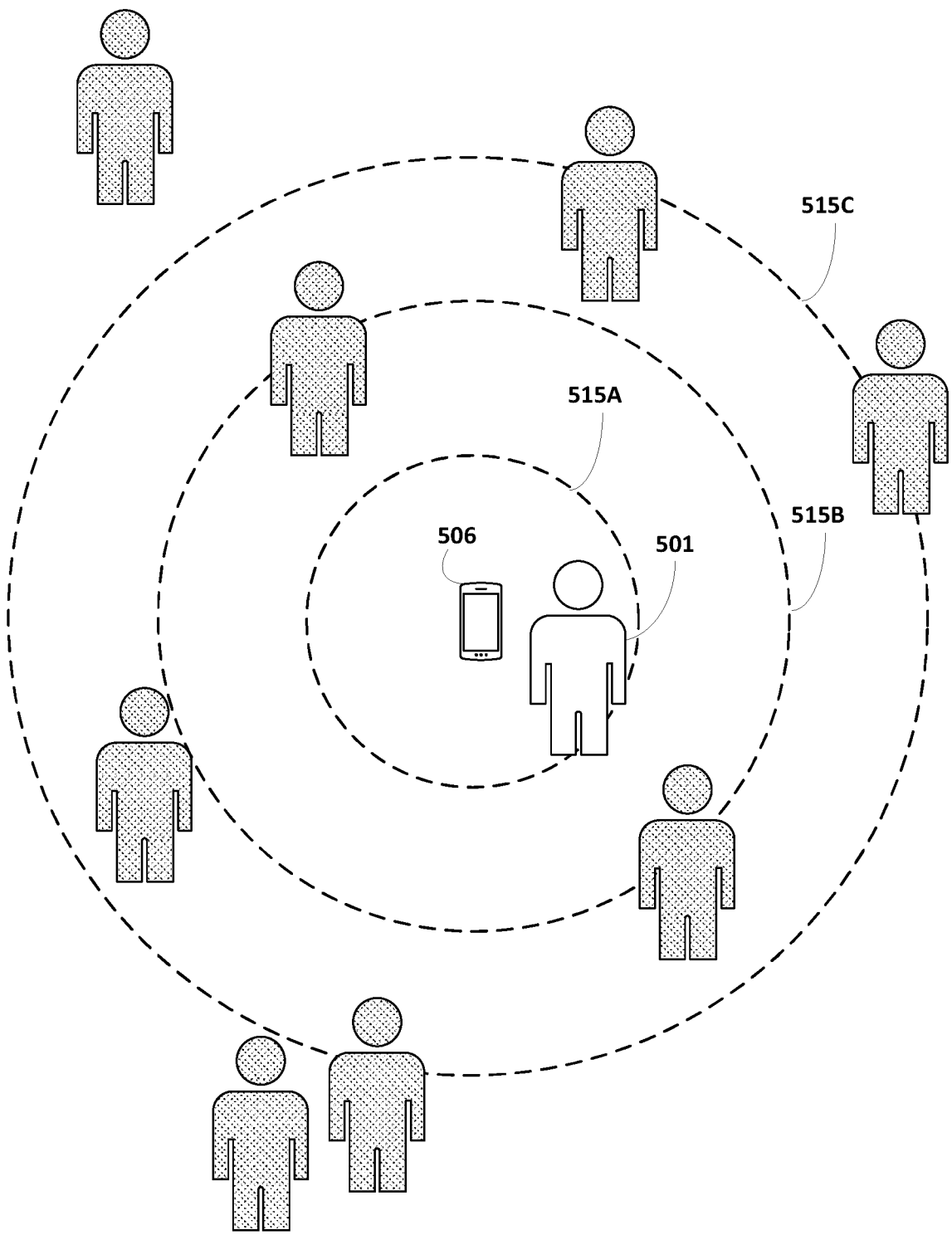

FIG. 5 depicts a situation in which proximity and/or identity may be used. In FIG. 5, a user 501 (shaded in white) holding a client device 506 is in an area crowded with multiple other people (shaded in grey). Suppose the other people also have client devices (not depicted) that are usable to engage with automated assistant 120. If other nearby people utter default hot words to invoke their automated assistants, that might inadvertently invoke automated assistant 120 on client device 506. Likewise, if user 501 utters default hot word(s) to invoke automated assistant 120 on client device 506, that might inadvertently invoke automated assistants on other devices carried by the other people.

Accordingly, in some implementations, automated assistant 120 may detect an identity of user 501 and/or that user 501 is within a predetermined proximity, and activate a custom set of dynamic hot words that are required to invoke automated assistant 120. In FIG. 5, for instance, if user 501 is within a first proximity 515A of client device 506 (and in some cases is identified), a first custom set of hot words may be activated that is unique to user 501 (e.g., manually selected by user 501). That way user 501 can utter these custom hot words without fear of accidently invoking an automated assistant on someone else's device. In some implementations, different proximity ranges may cause different dynamic hot words to become activated. For instance, in FIG. 5, if user 501 were detected outside of proximity range 515A, but within another proximity range 515B, then additional/alternative hot words may be activated. The same goes for a third proximity range 515C, or any number of proximity ranges. In some implementations, only default hot words, or no hot words, may be activated if user 501 is outside of proximity range 515C.

In the alternative, in some implementations, upon recognition of the identity of user 501, automated assistant 120 may implement speaker recognition to only respond to speech of user 501, and to ignore speech of others.

While implementations described herein have been focused on causing automated assistant 120 to take various actions (e.g., search for information, control media playback, stop a timer, etc.) in response to context-specific hot words, this is not meant to be limiting. Techniques described herein may be extended to other use cases. For example, techniques described herein may be applicable when a user wishes to fill in a form field, e.g., on a search web page. In some implementations, when a search bar or other similar textual input element is present in a web page, one or more additional context-specific hot words may be activated. For example, when a user navigates an assistant-enabled device to a web page having a search bar, the hot words "search for" may be activated, e.g., so that the user can simply say "search for <desired topic>" and the user's utterance following "search for" can be transcribed into the search bar automatically, without the user needing to invoke automated assistant 120 first.

In various implementations, transition of a computing device into a particular context may activate, in addition to or instead of one or more context-specific hot words, one or more context-specific gestures. For example, suppose a user is detected with a particular proximity of an assistant device. In some implementations, one or more context-specific gestures may be activated. Detection of those gestures, e.g., by invocation module 113, may trigger transition of automated assistant 120 into the general listening state and/or cause automated assistant 120 to perform some context-specific responsive action.

Figure 6:
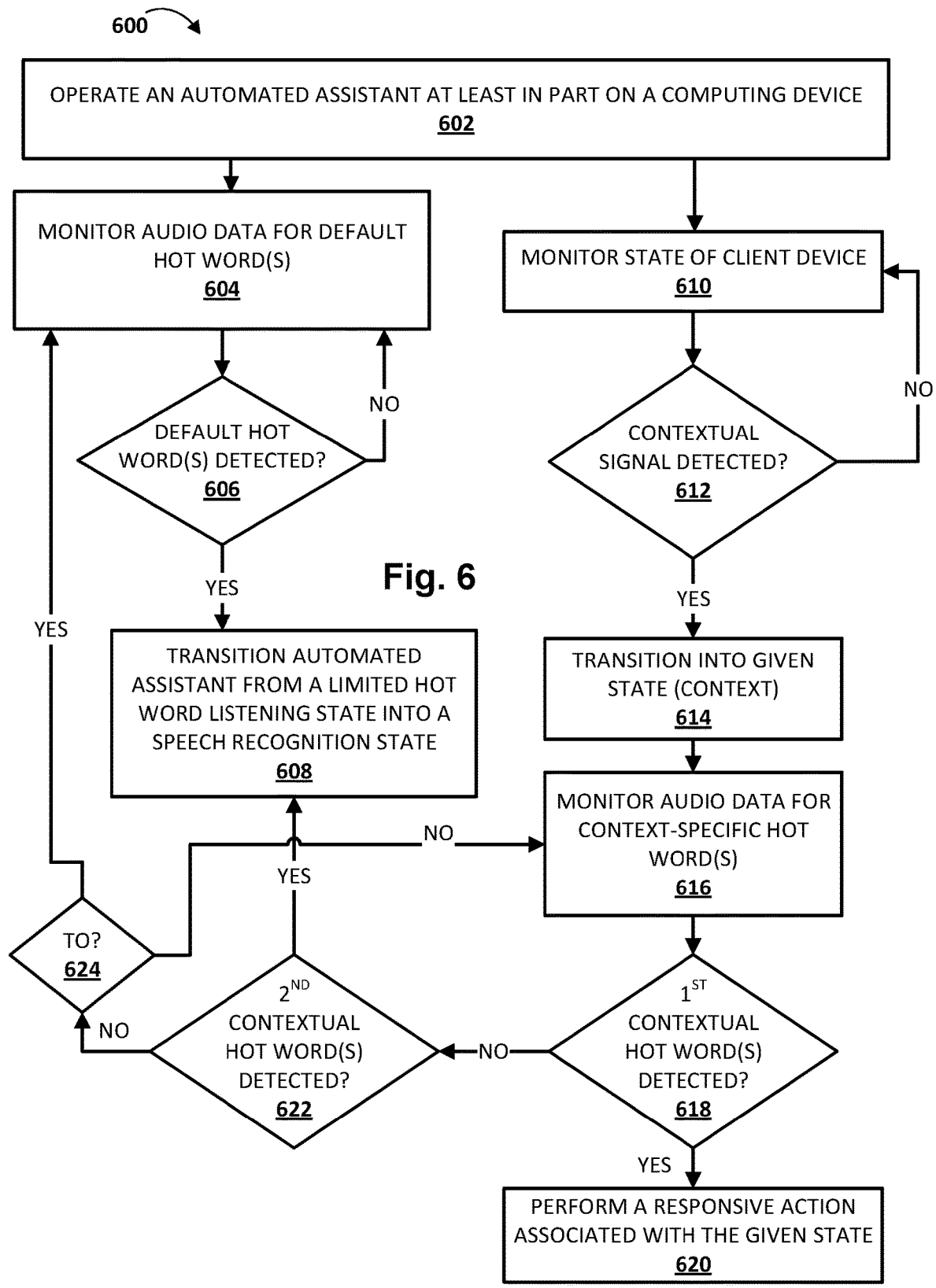
FIG. 6 depicts a flowchart illustrating an example method according to implementations disclosed herein.

FIG. 6 is a flowchart illustrating an example method 600 according to implementations disclosed herein. For convenience, the operations of the flow chart are described with reference to a system that performs the operations. This system may include various components of various computer systems, such as one or more components of automated assistant 120. Moreover, while operations of method 600 are shown in a particular order, this is not meant to be limiting. One or more operations may be reordered, omitted or added.

At block 602, the system may operate automated assistant 120 at least in part on a computing device (e.g., client device 106, 306, 406, 506). For example, and as noted above, in many cases automated assistant 120 may be implemented in part on client device 106 and in part on the cloud (e.g., cloud-based automated assistant components 119). At block 604, the system may monitor audio data captured by a microphone (e.g., 109) for one or more default hot words. For example, the audio data (or other data indicative thereof, such as an embedding) may be applied as input across one or more currently-active invocation models 114 to generate output. The output may indicate detection (block 606) of one or more of the default hot words. At block 608, the system may transition automated assistant 120 from a limited hot word listening state (e.g., default inactive state in FIG. 2) into a speech recognition state (e.g., general listening state in FIG. 2).

In some implementations, parallel to (or in series with) the operations of blocks 604-608, the system may, at block 610 monitor a state of the client device. For example, the system may monitor for one or more contextual signals, such as detected user presence, detected user identity, detection of a user's membership in a group, detection of a visual attribute, and so forth.

If, at block 612, the system detects a contextual signal, then at block 614, the system may transition the computing device into a given state. For example, the system may detect a contextual signal such as a user being sufficiently proximity to a client device, a user's identity, etc. After the transition of block 614, at block 616 the system may monitor the audio data captured by the microphone for one or more context-specific hot words, in addition to or instead of the one or more default hot words monitored for at block 604.

As noted previously, in some contexts, some hot words may transition automated assistant 120 into a general listening state, and other hot words may cause automated assistant 120 to perform a context-specific responsive action (e.g., stop the timer, pause media playback, etc.). Accordingly, at block 618, if the system detects a first one or more contextual hot words (e.g., hot words intended to cause automated assistant 120 to perform a context-specific task), then at block 620, the system may perform, or cause automated assistant 120 to perform, one or more context-specific responsive actions. On the other hand, if the first one or more contextual hot words are not detected at block 618, but a second one or more contextual hot words (e.g., hot words intended to simply invoke automated assistant 120 generally) are detected at block 622, then method 600 may proceed back to block 606, where automated assistant 120 is in the general listening state.

In some implementations, one or more timeouts may be employed to ensure that automated assistant 120 returns to a stable or default if no context-specific actions are requested. For example, if no first or second context-specific hot words are detected at blocks 618 and 622, respectively, then at block 624 a determination may be made as to whether a timeout expired (e.g., ten seconds, thirty seconds, one minute, etc.). If the answer at block 624 is yes, then method 600 may transition back to block 604, at which automated assistant 120 is transitioned into the default inactive state. However, if the answer at block 624 is no, then in some implementations, method 600 may proceed back to block 616, at which point the system may monitor for context-specific hot words.

Figure 7:
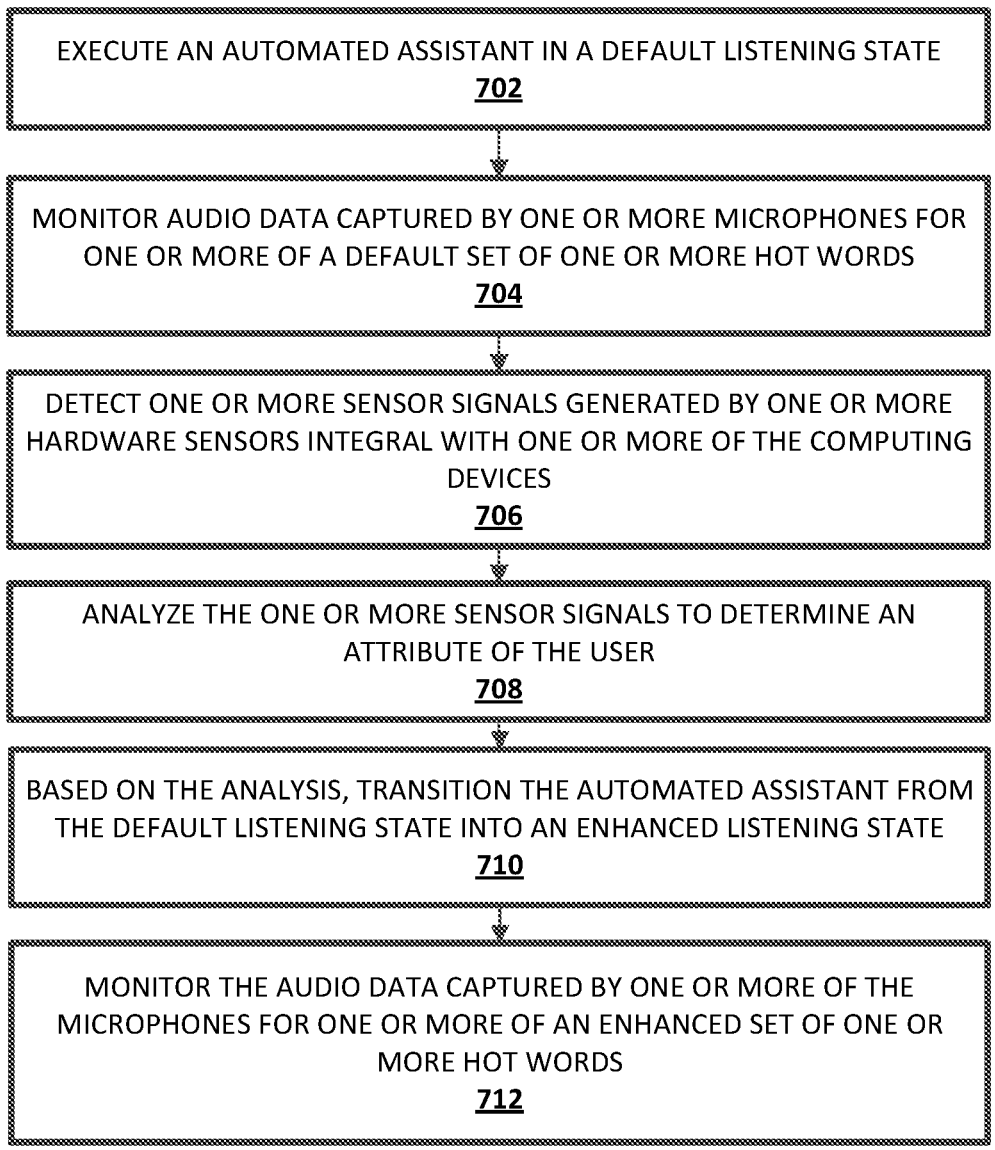
FIG. 7 depicts a flowchart illustrating an example method according to implementations disclosed herein.

FIG. 7 depicts an example method 700, similar to method 600, for practicing selected aspects of the present disclosure, in accordance with various embodiments. For convenience, the operations of the flow chart are described with reference to a system that performs the operations. This system may include various components of various computer systems. Moreover, while operations of method 700 are shown in a particular order, this is not meant to be limiting. One or more operations may be reordered, omitted or added.

At block 702, the system may execute an automated assistant in a default listening state. While in the default listening state, at block 704, the system may monitor audio data captured by one or more microphones for one or more of a default set of one or more hot words. Detection of one or more of the hot words of the default set may trigger transition of the automated assistant from the default listening state into a speech recognition state (e.g., block 608 of FIG. 6).

At block 706, the system may detect one or more sensor signals generated by one or more hardware sensors integral with one or more of the computing devices, such as a microphone, camera, PIR sensor, wireless component, etc. At block 708, the system may analyze the one or more sensor signals to determine an attribute of the user. This attribute of the user may be, for instance, an existential attribute about the user themselves, or a physical proximity of the user with one or more assistant devices. Non-limiting examples of attributes that may be determined at block 708 include, but are not limited to, the user being within a predetermined proximity of an assistant device, the user's identity, the user's membership in a group, that the user is detected by a proximity sensor (in situations in which distance might not be considered), a visual attribute of the user such as a uniform, badge, trinket, etc., and so forth.

At block 710, the system may, based on the analysis, transition the automated assistant from the default listening state into an enhanced listening state. While in the enhanced listening state, at block 712, the system may monitor the audio data captured by one or more of the microphones for one or more of an enhanced set of one or more hot words. Detection of one or more of the hot words of the enhanced set may trigger the automated assistant to perform a responsive action without requiring detection of one or more of the hot words of the default set. One or more of the hot words of the enhanced set may not be in the default set.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Figure 8:
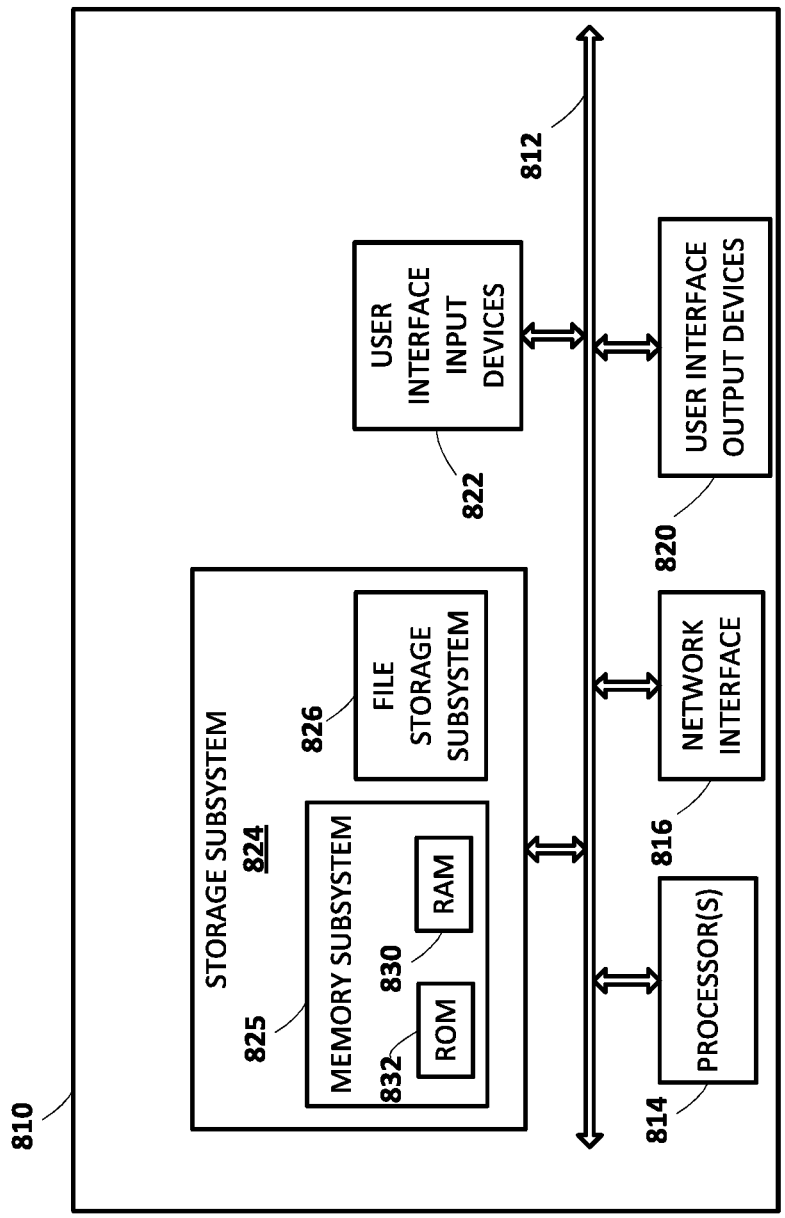
FIG. 8 illustrates an example architecture of a computing device.

FIG. 8 is a block diagram of an example computing device 810 that may optionally be utilized to perform one or more aspects of techniques described herein. In some implementations, one or more of a client computing device, user-controlled resources engine 134, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIGS. 6-7, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising: executing an automated assistant in a default listening state, wherein the automated assistant is executed at least in part on one or more computing devices operated by a user; while in the default listening state, and using a default on-device invocation model, monitoring audio data captured by one or more microphones for one or more of a default set of one or more hot words, wherein detection of one or more of the hot words of the default set triggers transition of the automated assistant from the default listening state into a speech recognition state in which a portion of the audio data or additional audio data is processed using speech-to-text (STT) processing; detecting one or more sensor signals generated by one or more hardware sensors integral with one or more of the computing devices; analyzing the one or more sensor signals to determine an attribute of the user; based on the analyzing, activating a contextual on-device invocation model that is trained to detect an enhanced set of one or more hot words, wherein one or more of the hot words of the enhanced set is not in the default based on the contextual on-device invocation model, monitoring the audio data captured by one or more of the microphones for one or more of the enhanced set of one or more hot words, wherein detection of one or more of the hot words of the enhanced set triggers the automated assistant to transition from the default listening state to the speech recognition state without requiring detection of one or more of the hot words of the default set.

2. The method of claim 1, wherein the one or more hardware sensors include a proximity sensor, and the attribute of the user comprises:
the user being detected by the proximity sensor, or
the user being detected by the proximity sensor within a predetermined distance of one or more of the computing devices.

3. The method of claim 1, wherein the one or more hardware sensors include a camera.

4. The method of claim 3, wherein the attribute of the user comprises:
the user being detected by the camera, or
the user being detected by the camera within a predetermined distance of one or more of the computing devices.

5. The method of claim 4, wherein the analyzing comprises facial recognition processing.

6. The method of claim 5, wherein the attribute of the user comprises an identity of the user.

7. The method of claim 3, wherein the attribute of the user comprises membership of the user in a group.

8. The method of claim 1, wherein the one or more hardware sensors include one or more of the microphones.

9. The method of claim 8, wherein the one or more attributes include the user being audibly detected based on the audio data captured by one or more of the microphones.

10. The method of claim 8, wherein the analyzing comprises voice recognition processing.

11. The method of claim 10, wherein the attribute of the user comprises an identity of the user.

12. The method of claim 8, wherein the attribute of the user comprises membership of the user in a group.

13. A system comprising one or more processors and memory operably coupled with the one or more processors, wherein the memory stores instructions that, in response to execution of the instructions by one or more processors, cause the one or more processors to execute an automated assistant in a default listening state, wherein the automated assistant is executed at least in part on one or more computing devices operated by a user; while in the default listening state, and using a default on-device invocation model, monitor audio data captured by one or more microphones for one or more of a default set of one or more hot words, wherein detection of one or more of the hot words of the default set triggers transition of the automated assistant from the default listening state into a speech recognition state in which a portion of the audio data or additional audio data is processed using speech-to-text (STT) processing; detect one or more sensor signals generated by one or more hardware sensors integral with one or more of the computing devices; analyze the one or more sensor signals to determine an attribute of the user; based on the analysis, activate a contextual on-device invocation model that is trained to detect an enhanced set of one or more hot words, wherein one or more of the hot words of the enhanced set is not in the default set based on the contextual on-device invocation model, monitor the audio data captured by one or more of the microphones for one or more of the enhanced set of one or more hot words, wherein detection of one or more of the hot words of the enhanced set triggers the automated assistant to transition from the default listening state to the speech recognition state without requiring detection of one or more of the hot words of the default set.

14. The system of claim 13, wherein the one or more hardware sensors include a proximity sensor, and the attribute of the user comprises:
the user being detected by the proximity sensor, or
the user being detected by the proximity sensor within a predetermined distance of one or more of the computing devices.

15. The system of claim 13, wherein the one or more hardware sensors include a camera.

16. The system of claim 15, wherein the attribute of the user comprises:
the user being detected by the camera, or
the user being detected by the camera within a predetermined distance of one or more of the computing devices.

17. At least one non-transitory computer-readable medium comprising instructions that, in response to execution of the instructions by one or more processors, cause the one or more processors to perform the following operations: executing an automated assistant in a default listening state, wherein the automated assistant is executed at least in part on one or more computing devices operated by a user; while in the default listening state, and using a default on-device invocation model, monitoring audio data captured by one or more of the microphones for one or more of a default set of one or more hot words, wherein detection of one or more of the hot words of the default set triggers transition of the automated assistant from the default listening state into a speech recognition state in which a portion of the audio data or additional audio data is processed using speech-to-text (STT) processing; detecting one or more sensor signals generated by one or more hardware sensors integral with one or more of the computing devices; analyzing the one or more sensor signals to determine an attribute of the user; based on the analyzing, activating a contextual on-device invocation model that is trained to detect an enhanced set of one or more hot words, wherein one or more of the hot words of the enhanced set is not in the default set based on the contextual on-device invocation model, monitoring the audio data captured by one or more of the microphones for one or more of the enhanced set of one or more hot words, wherein detection of one or more of the hot words of the enhanced set triggers the automated assistant to transition from the default listening state to the speech recognition state without requiring detection of one or more of the hot words of the default set.

18. The at least one non-transitory computer-readable medium of claim 17, wherein the one or more hardware sensors include one or more of the microphones.

* * * * *